(12) United States Patent
Ishii

(10) Patent No.: US 7,548,342 B2
(45) Date of Patent: Jun. 16, 2009

(54) IMAGE PROCESSING APPARATUS

(75) Inventor: Hiroshi Ishii, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 631 days.

(21) Appl. No.: 11/225,769

(22) Filed: Sep. 12, 2005

(65) Prior Publication Data

US 2006/0152746 A1     Jul. 13, 2006

(30) Foreign Application Priority Data

Jan. 7, 2005    (JP)   ............... 2005-002607

(51) Int. Cl.
*H04N 1/60* (2006.01)
*G06F 15/00* (2006.01)
*G06K 1/00* (2006.01)

(52) U.S. Cl. ...................... 358/1.9; 358/1.13
(58) Field of Classification Search .......... 358/1.9–3.32
See application file for complete search history.

(56) References Cited

U.S. PATENT DOCUMENTS 6,679,575 B2 * 1/2004 Someno ................. 347/15
6,965,453 B1 * 11/2005 Mori ..................... 358/1.9
2005/0062779 A1 * 3/2005 Mimamino ............. 347/15

FOREIGN PATENT DOCUMENTS

JP    2002-33901 A    1/2002
JP    2002-237946 A    8/2002

* cited by examiner

*Primary Examiner*—Douglas Q Tran
(74) *Attorney, Agent, or Firm*—Frishauf, Holtz, Goodman & Chick, P.C.

(57) ABSTRACT

An image forming apparatus includes: a scanner which reads documents and produces image data in a first color space; a color converter which converts image data in the first color space into image data in a second color space; a printer unit which prints out the converted image data in the second color space; and a controller which receives image data in the first color space from an external apparatus. The controller converts the received image data into image data in the second color space and transmits the converted image data to the printer unit if the received image data do not have predetermined property, and the controller transmits the received image data to the color converter without converting within the controller if the received image data have the predetermined property.

14 Claims, 3 Drawing Sheets

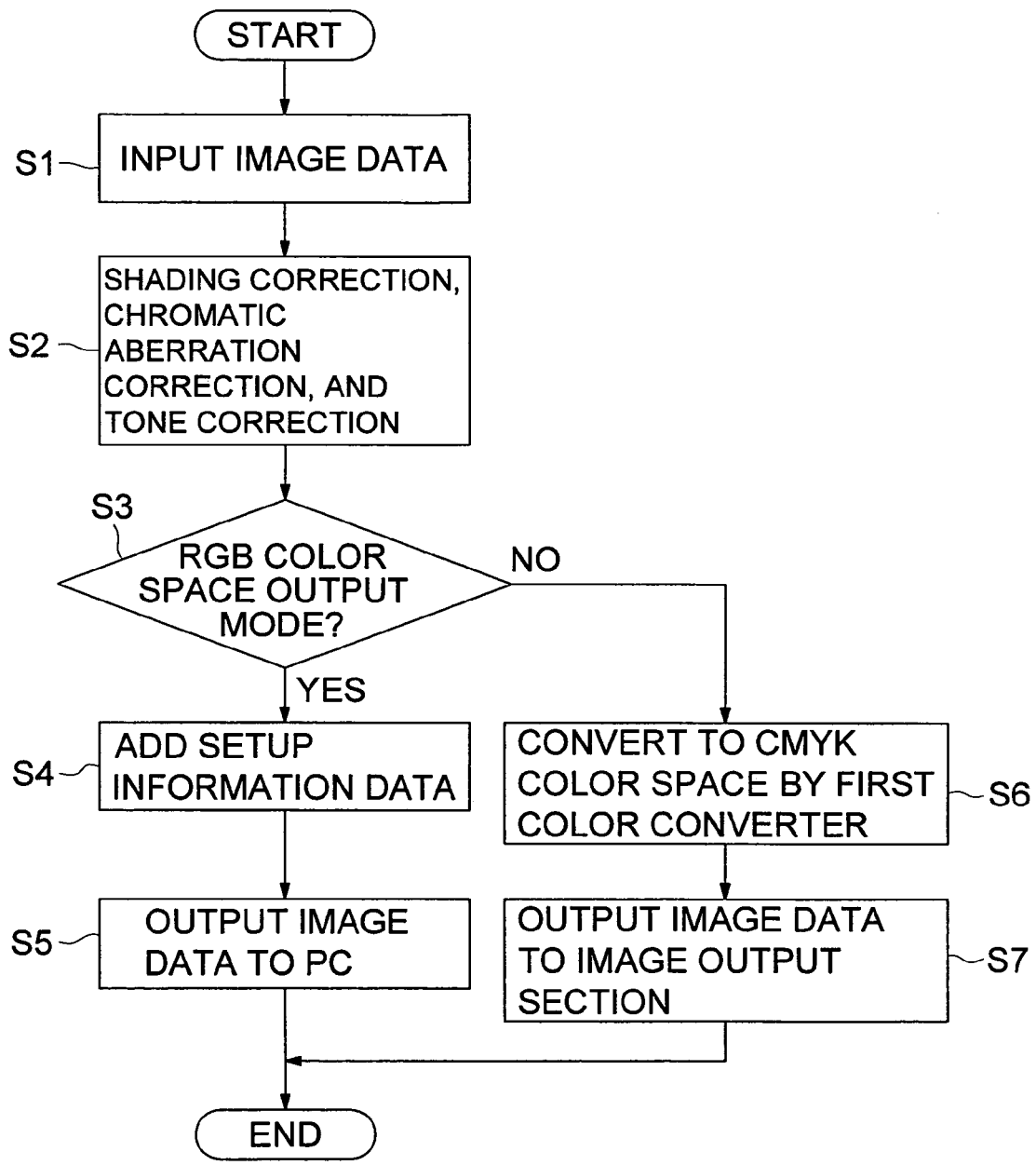

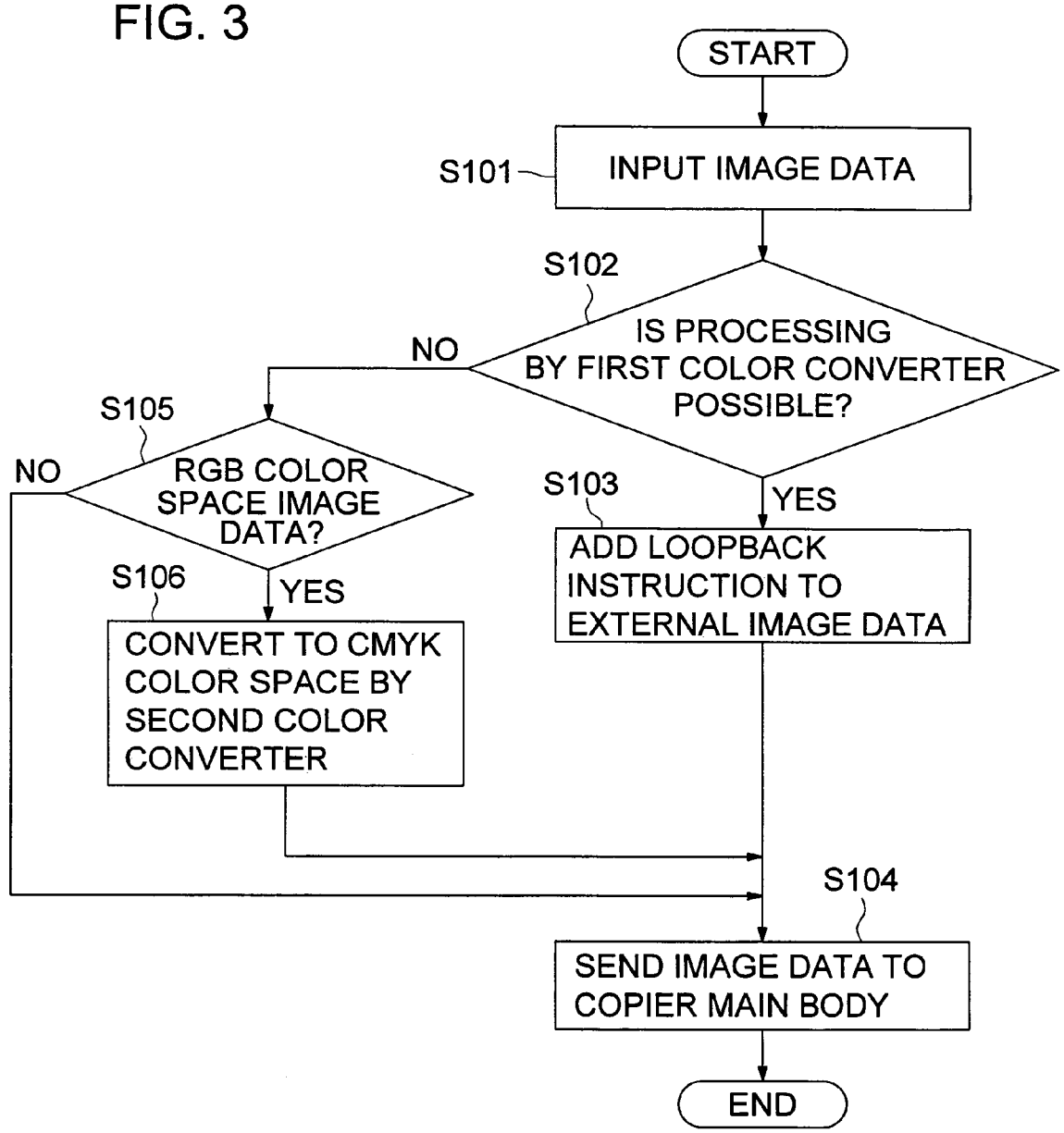

IMAGE PROCESSING APPARATUS

This application claims priority from Japanese Patent Application No. 2005-002607 filed on Jan. 7, 2005, which is incorporated hereinto by reference.

BACKGROUND

1. Field of the Invention

The present invention relates to an image processing apparatus.

2. Description of Related Art

There has been known a digital multifunctional machine comprising a copy function that reads out an original image by an image reading section such as a color image scanner and generates image data based on the read out original image to output the image data by an image output section such as a color printer or a color facsimile as an output image, and a printer function that outputs image data having been input from outside from an image output section. Further, recent digital multifunctional machines generally include a scanning out function that outputs image data generated based on the read out original image to an external device such as a personal computer.

In such digital multifunctional machines, the color system is required to be converted by subjecting image data to a given conversion processing. Namely, the image reading section for reading out an original image reads out the original image with the color system of R (read), G (green) and B (blue) in which the original image is easily processed as image data, and the image output section converts the image data comprising the RGB color space into the color space of C (cyan), M (magenta), Y (yellow), and K (black) to output as an output image. On the contrarily, image data which is output to an external device by the scanning out function is generally kept in the RGB color space.

Further, in order to use the printer function, image data of the RGB color space which is input from outside is required to be subjected to CMYK color conversion which is generally carried out by a printer controller which adopts a conversion processing method different from the RGB-CMYK color conversion.

Therefore, there has been a problem that between the image data that the image data of RGB color space the image reading section read out is subjected to the CMYK color conversion by a digital multifunctional machine main body when used as the copy function, and the image data that is once scanned out to the external device and is input again in the printer controller to be subjected to the CMYK color conversion, the color reproducibility differ from each other due to the difference in their color conversion processing methods, thereby the output results of the output images differ from each other.

Although the printer controller may be incorporated into the main body of the digital multifunctional machine, the above problem will occur as long as the print controller includes the function to carry out its own RGB-CMYK color conversion.

Incidentally, as the technologies considering the color reproducibility of the image data which is once scanned out, such apparatuses have been proposed including: an apparatus for embedding color attribute information which is referred to in the color conversion into image data in addition to converting the output image into a device independent color (for example, see Patent Document 1); and an apparatus for outputting machine difference correction values together with the image data in scanning out (for example, see Patent Document 2).

[Patent Document 1] Japanese Patent Publication Laid-Open No. 2002-33901
[Patent Document 2] Japanese Patent Publication Laid-Open No. 2002-237946

However, these proposed technologies are not those considering the color reproducibility based on the two different color conversion processing methods as described above. Therefore, there has been a problem that the image qualities are not necessarily identical between that being output after an original image is read out by the image reading section and is subjected to the color conversion, and that being output after the original image is read out from the image reading section and is once output outside, and then the output image is input again from outside.

SUMMARY OF THE INVENTION

In order to cope with the above problem, an object of the present invention is to provide an image processing apparatus capable of unifying the image quality of the image output after an original image is read out by the image reading section and is subjected to the color conversion, and the image quality of the image output after the original image is read out by the image reading section and is once output outside, and then the output image is input again from outside.

The above object can be achieved by any one of the following Structures (1) to (13).

(1) An image forming apparatus comprising: a scanner which reads documents and produces image data in a first color space; a color converter which converts image data in the first color space into image data in a second color space; a printer unit which prints out the converted image data in the second color space; and a controller which receives image data in the first color space from an external apparatus, said controller converting the received image data into image data in the second color space and transmitting the converted image data to the printer unit if the received image data have no predetermined property, and said controller transmitting the received image data to the color converter without converting within the controller if the received image data have the predetermined property.

(2) The image forming apparatus described in Structure (1), further comprising an output interface which outputs image data in the first color space produced by the scanner with specific information, wherein the controller judges the received image data have the predetermined property when the received image data have the specific information.

(3) The image forming apparatus described in Structure (2), wherein the specific information is machine information of the image forming apparatus.

(4) The image forming apparatus described in Structure (3), wherein the machine information includes at least one of a serial number of the image forming apparatus and a version number of a firmware installed into the image forming apparatus.

(5) The image forming apparatus described in Structure (2), wherein the specific information includes parameter information which is used for converting image data in the first color space into image data in the second color space in the color converter.

(6) The image forming apparatus described in Structure (1), wherein the first color space is RGB color space and the second color space is CMYK color space.

(7) The image forming apparatus described in Structure (1), wherein the image forming apparatus comprises a copier and a printer controller, wherein the copier includes the scanner, the color converter and the printer, and the printer controller includes the controller.

(8) A controller device connectable to an imaging device which comprises a first color converter to convert image data in a first color space to image data in a second color space and a printer to print out the converted image data in the second color space, said controller device comprising: a receiver which receives image data in the first color space from an external apparatus; a second color converter which converts the received image data into image data in the second color space if the received image data have no predetermined property; and a transmitter which transmits the converted image data to the imaging device if the received image data have no predetermined property and transmits the received image data to the imaging device without converting in the second color converter if the received image data have the predetermined property.

(9) The controller device described in Structure (8), wherein the imaging device outputs image data in the first color space produced by the scanner with specific information, and wherein the controller further comprises a judging unit which judges the received image data have the predetermined property when the received image data have the specific information.

(10) The controller device described in Structure (9), wherein the specific information is machine information of the imaging apparatus.

(11) The controller device described in Structure (10), wherein the machine information includes at least one of a serial number of the imaging apparatus and a version number of a firmware installed into the imaging apparatus.

(12) The controller device described in Structure (9), wherein the specific information includes parameter information which is used for converting image data in the first color space into image data in the second color space in the imaging device.

(13) The controller device described in Structure (8), wherein the first color space is RGB color space and the second color space is CMYK color space.

The invention itself, together with further objects and attendant advantages, will best be understood by reference to the following detailed description taken in conjunction with the accompanying drawings.

BRIEF DESCRIPTION OF THE DRAWINGS

FIG. 2 is a flow chart for illustrating an image data output processing by an image reading section 1; and FIG. 3 is a flow chart for illustrating an image output processing by an image output section 2.

DETAILED DESCRIPTION OF THE PREFERRED EMBODIMENT

Figure 1:
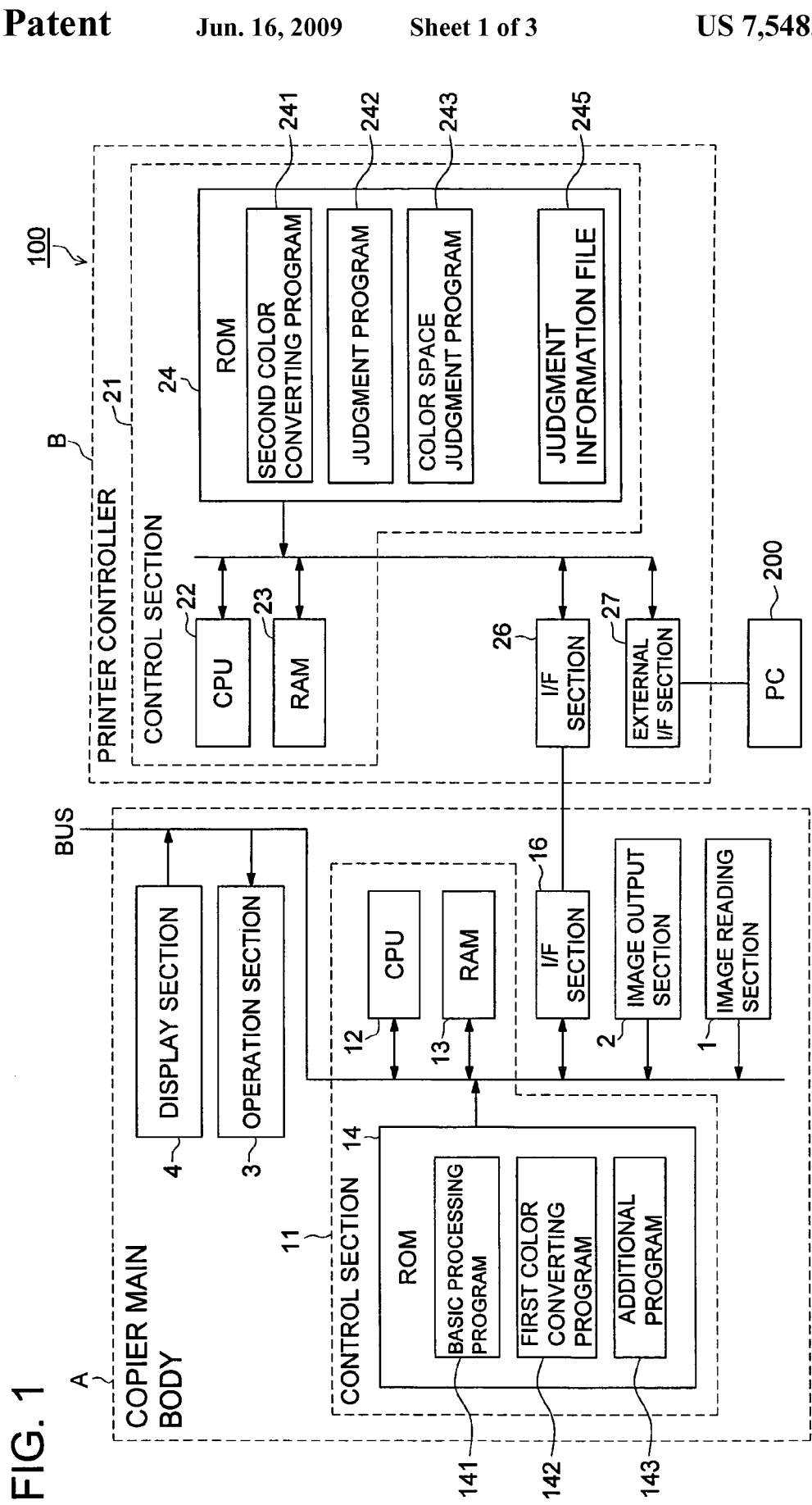
FIG. 1 is a block diagram showing an inside configuration of a digital multifunctional color copier 100 in an embodiment 1 of the present invention.

An embodiment of the present invention will be described in detail with reference to drawings.

FIG. 1 is a view showing a relation between the image processing apparatus 100 and a personal computer 200 which is one of the external devices and coupled thereto. The image processing apparatus 100 comprises a copier main body A and a printer controller B, in which the personal computer 200 is coupled to the image processing apparatus 100 via the printer controller B. As described below, image data of an original image read out by an image reading section 1 is output to the personal computer 200 via the printer controller B, and the image data output from the personal computer 200 is input to the image processing apparatus 100 via the printer controller B.

As the method of outputting image data to the image processing apparatus 100 from the personal computer 200, there are two methods including a method that instructs printing from an application being run by the personal computer 200 via a printer driver and a method that directly transmits image data to the image processing apparatus 100 from the personal computer 200. In the latter case, an icon of the image processing apparatus 100 is provided on the desktop of the personal computer 200 and an image data file is directly dropped on the icon to transmit the dropped image data file to the image processing apparatus 100.

As shown in FIG. 1, the copier main body A in the digital multifunctional color copier 100 as the image processing apparatus comprises the image reading section 1 for reading out image data of the RGB color space from an original image, the image output section 2 for carrying out printing of an image based on the image data read out by the image reading section 1, an operation section 3 for inputting a given instruction to the copier main body A, and a display section 4 for displaying a given image. The image reading section 1 and the image output section 2 and the operation section 3 and the display section 4 are coupled to each other by buses. On the contrarily, the copier main body A and the printer controller B are coupled to each other via respective I/F sections 16 and 26. The personal computer 200 is coupled via an external I/F section 27 of the printer controller B.

Incidentally, the image reading section 1 of the digital multifunctional color copier 100 can be selectively provided with the RGB color space output mode that outputs the read out image to the external device such as the personal computer 200 as the image data in the RGB color space and the CMYK color space output mode that converts the read out image into the CMYK color space and carries out printing in the image output section 2.

Accordingly, for example, when image data of a digital image is desired to be subjected to image processing, the followings are possible: image data of the RGB color space which is the color system in which the image is easily processed as the image data is created, and the image data is output from the digital multifunctional color copier 100 to the personal computer 200, being subjected to a desired image processing, and input again to the digital multifunctional color copier 100 to print from the image output section 2; or the original image is read out in the image reading section 1 to directly print from the image output section 2. In this case, the former is the RGB color space output mode and the latter is the CMYK color space output mode. In the former case, it is naturally possible that the image data having been output to the personal computer 200 is stored without correction and is input again later to the digital multifunctional color copier 100 to print from the image output section 2.

The RGB color space output mode and the CMYK color space output mode may be previously set by a user, and for example, by selecting and inputting the output mode via the operation section 3, the user can carry out the processing in the desired mode.

A control section 11 of the copier main body A comprises a CPU (Central Processing Unit) 12, a RAM (Random Access Memory) 13, and a ROM (Read Only Memory) 14 and other related component.

The CPU 12 manages and controls the entire behavior of the copier main body A, in response to a given timing or an instruction input via the operation section 3 and the like, by reading out various types of system programs stored in the ROM 14 to deploy a program in a work area of the RAM 13, and based on the program, carrying out the instruction to each of the sections comprising the copier main body A or the transmission of data and the like.

The RAM 13 is used as the work area of the CPU 12 and temporarily stores various types of programs read out from the ROM 14 and data associated with these programs and the like in a memory area.

The ROM 14 stores in addition to the various types of data processing programs to be executed by the CPU 12, various types of default settings and the like associated with the data processing programs. More specifically, the ROM 14 stores a basic processing program 141, a first conversion processing program 142, an additional program 143 and other related programs.

The basic processing program 141 is the program for subjecting image data of the RGB color space read out in the image reading section 1 to a given image processing.

More specifically, by executing the basic processing program 141, the CPU 12 of the control section 11 subjects the image data in the RGB color space to the image processing, such as, for example, shading correction for correcting output irregularities in each of the elements of a CCD sensor (described below), chromatic aberration correction for correcting the aberration of the imaging point of the image due to color wavelength differences, and tone correction for correcting the sharpness and brightness of the image and related other corrections.

The first conversion processing program 142 is the program for converting image data into the image data in the CMYK color space, wherein the image data is read out from the image reading section 1, which is subjected to the shading correction, chromatic aberration correction, tone correction and the like and is subjected to a given image processing.

More specifically, the control section 11 converts image data in the RGB color space into image data in the CMYK color space when the CPU 12 executes the first conversion program 142 as the first color converter, wherein the image data is read out from the image reading section 1, which is subjected to the image processing such as the shading correction by the CPU 12 and is subjected to the image processing, such as, for example, Lab conversion for fitting to the Lab chromaticity system, variable magnification for adjusting the size of the image data, and γ correction for correcting the brightness of the entire image and the color saturation to be displayed in a monitor.

Accordingly, in the CMYK color space output mode, image data which has been read out by the image reading section 1 and subjected to all of the image processing described above is output to the image output section 2 in which an image based on the image data is printed.

The additional program 143 is the program for adding setup information in reading to image data of the RGB color space having been read out by the image reading section 1.

More specifically, the control section 11 adds the setup information data to the image data in the RGB color space as a header when the CPU 12 executes the additional program 143 as the adding unit.

The setup information is meant herein, for example, a serial number as the machine information of the copier main body A or a version number of a firmware, adjustment value information which is specific to the image reading section 1, and parameter information in scanning by the image reading section 1, and of those the setup information contains at least one or more information including the machine information. In the present embodiment, all of the information described above is contained.

Further, the adjustment value information which is specific to the image reading section 1 is, for example, the information involving sharpness, contrast, tone and the like, and the parameter information in scanning is, for example, the information involving the image quality mode and the like.

Accordingly, in the RGB color space output mode, the image data which is subjected to the image processing such as the shading correction, the chromatic aberration correction and the tone correction and is added with the setup information by the adding unit, formatted into, for example, a TIFF file or a PDF file, and then is output to the personal computer 200 and the like as the external device.

The image reading section 1 comprises, for example, a platen, a light source, a CCD (Charge Coupled Device) sensor, an A/D conversion section and the like.

Image data is the digital signal image data, wherein an original image placed on the document platen is illuminated by a light source, and analog signal image data obtained by projecting an image of the original image onto the CCD sensor is subjected to A/D conversion in the A/D conversion section. The image reading section 1 outputs the image data to the control section 11.

The image output section 2 comprises a paper feeding section for feeding various types of printing paper and a transportation section (not shown) for transporting printing paper, and based on the image data in the CMYK color space, forms an image on a recording medium such as paper or OHP sheet by the image forming method such as, for example, an inkjet method, a laser method, a thermal transfer method, or a dot impact method to output the image.

Incidentally, as the image data of the image output from the image output section 2, there includes not only the image data which is read out in the image reading section 1 and converted from the RGB color space into the CMYK color space by the control section 11, but also the image data which is read out in the image reading section 1, once output to the external device such as the personal computer 200, input again to the digital multifunctional color copier 100 and then is converted from the RGB color space into the CMYK color space by the copier main body A, the image data which is directly input from the external device and converted from the RGB color space into the CMYK color space by the printer controller B, and the image data which is directly input from the external device in the CMYK color space and the like.

The printer controller B is constituted by a control section 21, an I/F section 26 having the same configuration as that of the I/F section 16 in the copier main body A, and an external I/F section 27 to which the external device is coupled and other related components, wherein the control section 21 is constituted by a CPU 22, a RAM 23, and a ROM 24 and the like.

The CPU 22 manages and controls the entire behavior of the printer controller B by reading out various types of system programs stored in the ROM 24 to deploy a program in the work area of the RAM 23 in response to a given timing or an instruction having been input via the operation section 3 and the like, and based on the program, carrying out the instruction to each of the sections constituting the printer controller B and the transfer of data and the like.

The RAM 23 is used as the work area of the CPU 22, which temporarily stores various types of programs read out from the ROM 24 and data associated with these programs and the like in the memory area.

The ROM 24 stores in addition to the various types of data processing programs to be executed by the CPU 22, various types of initial settings and the like associated with the data processing programs. More specifically, the ROM 24 stores a second conversion processing program 241, a judgment program 242, a color system judgment program 243, and a judgment information file 245 and the like.

The second conversion processing program 241 is the program for converting image data of the RGB color space which is input from the external device such as the personal computer 200 via the external I/F section 27 (referred to as "external image data in the RGB color space" hereinafter) into the image data in the CMYK color space.

More specifically, the control section 21 converts the external image data in the RGB color space into the image data of CMYK color space when the CPU 22 executes the second conversion program 241 as the second color converter.

The judgment program 242 is the program for judging the possibility of carrying out the image processing by the first color converter of the copier main body A toward the external image data of the RGB color space by referring to the setup information added to the external image data of the RGB color space which has been input from outside.

More specifically, the control section 21 judges whether the external image data is added with the setup information data or not when the CPU 22 executes the judgment program 242 as the judging unit. When the setup information data is added, the control section 21 extracts the setup information data from the image data, and based on the setup information stored in the setup information data, judges the possibility of carrying out the image processing by the first color converter of the copier main body A.

Still more specifically, the control section 21 judges whether the serial number or version number and the like stored in the setup information and the serial number of the copier main body A or the version number and the like are identical or not, and when they are identical, judges that the image processing of the external image data by the first color converter is possible. Incidentally, when the image processing by the first color converter is judged to be possible, the external image data is sent to the copier main body A via the I/F section 26 in the sate being added with only the loop back signal, without being subjected to the image processing by the print controller B. When receiving the image data added with the loopback signal from the printer controller B, the copier main body A carries out the image processing by the first color converter.

The color system judgment program 243 is the program for judging whether the color system of the input image data is RGB color space or the CMYK color space.

The judgment information file 245 is the file in which the information used for judging the possibility of carrying out the image processing of the external image data by the first color converter, and more specifically, the serial number which are the machine information of the copier A and the version number and the like are stored.

Next, the image data output processing by the digital multifunctional color copier 100 will be described using the flow chart of FIG. 2.

The image data output processing is started by inputting the image data via the image reading section 1.

When image data of an original image is input via the image reading section 1 (Step S1), the CPU 12 subjects the image data in the RGB color space to the image processing such as the shading correction, the aberration correction, and the tone correction, by reading out the basic processing program 141 from the ROM 14, deploying and executing the program in a given workspace of the RAM 13 (Step S2), and then the CPU 12 moves to the next step.

In Step S3, the CPU 12 judges whether the output mode setting is the RGB color space output mode or the CMYK color space output mode (Step S3).

When the CPU 12 judges that the output mode is the RGB color space output mode (Step S3; Yes), the CPU 12 adds the setup information data to the image data by reading out the additional program 143 from the ROM 14, deploying and executing the program in the given workspace of the RAM 23 (Step S4), and outputs the image data in the RGB color space to the external device such as the personal computer 200 or the like (Step S5), and then terminates the image data output processing.

On the contrarily, when the CPU 12 judges that the output mode is the CMYK color space output mode (Step S3; No), the CPU 12 converts the image data in the RGB color space into the image data in the CMYK color space by reading out the first conversion processing program 142 from the ROM 14, deploying and executing the program in the given workspace of the RAM 23 (Step S6), and outputs the image data to the image output section 2 to execute printing (Step S7), and then terminates the image data output processing.

Next, the image data processing by the printer controller B will be described using the flow chart of FIG. 3.

The image data processing is started by inputting the image data in the printer controller B.

When the image data is input in the printer controller B via the external I/F section 27 (Step S101), the CPU 22 judges the possibility of carrying out the image processing of the external image data by the first color converter of the copier main body A by reading out the judgment program 242 from the ROM 24, deploying and executing the program in the given workspace of the RAM 23 (Step S102). Namely, in Step S102, the input external image data is scanned out from the digital multifunctional color copier 100, and then is judged whether the data is input again in the printer controller B.

When the CPU 22 judges that the image processing of the external image data by the first color converter is possible (Step S102; Yes), the CPU 22 adds the loop back instruction to the external image data so as to convert the image data into the image data in the CMYK color space by subjecting to the image processing by the first color converter (Step S103), and transmits the image data to the copier main body A by the transmitter (Step S104).

Further, in Step S102, when the CPU 22 judges that the image processing toward the external image data by the first color converter is not possible (Step S102; No), the CPU 22 judges whether the image data is the image data in the RGB color space or the image data in the CMYK color space, by reading out the color system judgment program 243 from the ROM 24, deploying and executing the program in the given workspace of the RAM 23 (Step S106).

When the CPU 22 judges that the image data is the image data in the RGB color space (Step S105; Yes), the CPU 22 converts the image data in the RGB color space into the image data in the CMYK color space by reading out the second conversion processing program 241 from the ROM 24, deploying and executing the program in the given workspace of the RAM 23 (Step S106).

Further, the CPU 22 transmits the image data in the CMYK color space to the copier main body A (Step S104).

On the contrarily, in Step S105, when the CPU 22 judges that the image data is not the image data in the RGB color space, namely, the image data is the image data in the CMYK color space (Step S105; No), the CPU 22 sends the image data as it is to the copier main body A (Step S104).

With the digital multifunctional color copier 100 as described above, when image data is that of the original image which is read out as the image data in the RGB color space by the first color converter of the copier main body A, even though the image data is once output outside the digital multifunctional color copier 100 (e.g. personal computer) and input again in the digital multifunctional color copier 100, the image data can be output from the image output section 2 as the image of the CMYK color space by being subjected to the given image processing by the first color converter of the copier main body A, rather than by the second color converter of the printer controller B. With this feature, it is possible to unify the image quality of the image output from the image output section 2 after the original image is read out by the image reading section 1 and is subjected to the color conversion from the image data of RGB color space into the image data of CMYK color space, and the image quality of the image output after original image is read out by the image reading section 1, once output outside the digital multifunctional color copier 100 (e.g. personal computer) and input again from the personal computer to the digital multifunctional color copier 100, and then is subjected to the color conversion from the image data in the RGB color space to the image data in the CMYK color space.

Further, as the setup information to be added to the image data, in addition to the machine information of the copier main body A, adjustment value information which is specific to the image reading section 1, parameter information in image reading by the image reading section 1 and other related information may be used, so that the judgment of the possibility of carrying out the image processing toward the external image data of the RGB color space by the first color converter is adequately carried out based on the clear judgment standard, i.e. the machine information, thereby the image qualities can be unified without fail.

Further, when it is judged that the image processing by the first color converter is possible, the adjustment value information specific to the image reading section 1 which is added to the image data as the setup information and the parameter information in image reading and other related information may be used in the image processing, thereby unification of the image qualities may further be ensured.

Incidentally, when the setup information data is added to the image data by the adding unit of the copier main body A, the pixel judgment information may also be added to the image data.

The pixel judgment information is meant herein, for example, the information enabling judgment of whether the image each pixel composes is a character or a picture, more specifically, for example, it is meant the information such as coloring judgment information (chromatic color or achromatic color), halftone dot judgment information, character judgment information and other related information, and using the pixel judgment information comprising these judgment information as described above, the image the pixels compose can be judged.

Such picture judgment information is used, for example, with data called a judgment bit. The judgment bit is added in the sate enabling judgment of whether each of the pixels composes a character image or a picture image.

Accordingly, for example, when the pixel judgment information (judgment bit) is added to the image data together with the setup information data by the adding unit of the image reading section 1, the judgment bit is also read out in addition to the setup information data by the judging unit of the image output section 2. When the image data is provided with the judgment bit, judgment results in the screen processing such as tone conversion and resolution conversion and the like may be effectively used.

Further, it may be configured such that the image data in the RGB color space read out by the image reading section 1 is converted into the image data in the CMYK color space, and then further separated to process colors (C, M, Y, K) to execute separation output to the image output section 2.

When the image of the image data with the judgment bit added thereto and the image of the image data subjected to the separation output are confirmed by a personal computer and the like, the image can be displayed in a monitor and the like using a dedicated software capable of canceling restriction settings added to these images.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:
   a scanner which reads documents and produces image data in a first color space to which a predetermined property is added, the image data being output to an external apparatus;
   a first color converter which converts the image data in the first color space into image data in a second color space;
   a second color converter which converts image data in the first color space input from the external apparatus into image data in the second color space;
   a printer unit which prints out the converted image data in the second color space; and
   a controller which receives image data in the first color space from the external apparatus,
   wherein said controller provides the received image data to the second color converter to convert the received image data into image data in the second color space when the received image data does not have the predetermined property and transmits the converted image data to the printer unit, and
   wherein said controller transmits the received image data to the first color converter to convert the received image data into the image data in the second color space without converting by the second color converter when the received image data has the predetermined property.

2. The image forming apparatus of claim 1, further comprising an output interface which outputs image data in the first color space produced by the scanner with specific information, and wherein the controller judges that the received image data has the predetermined property when the received image data has the specific information.

3. The image forming apparatus of claim 2, wherein the specific information is machine information of the image forming apparatus.

4. The image forming apparatus of claim 3, wherein the machine information includes at least one of a serial number of the image forming apparatus and a version number of a firmware installed into the image forming apparatus.

5. The image forming apparatus of claim 2, wherein the specific information includes parameter information which is used for converting image data in the first color space into image data in the second color space in the first color converter.

6. The image forming apparatus of claim 1, wherein the first color space is RGB color space and the second color space is OMYK color space.

7. The image forming apparatus of claim 1, wherein the image forming apparatus comprises a copier and a printer controller, and wherein the copier includes the scanner, the first color converter and the printer, and the printer controller includes the controller.

8. A controller device connectable to an imaging device which comprises a first color converter to convert image data in a first color space into image data in a second color space, wherein a predetermined property is added to the image data in the first color space that is output from the imaging device to an external apparatus, and a printer to print out the converted image data in the second color space, said controller device comprising:
- a receiver which receives image data in the first color space from the external apparatus;
- a second color converter which converts the received image data into image data in the second color space when the received image data does not have the predetermined property; and
- a transmitter which transmits the converted image data to the imaging device when the received image data does not have the predetermined property, and transmits the received image data to the first color converter of the imaging device without converting in the second color converter when the received image data has the predetermined property.

9. The controller device of claim 8, wherein the imaging device outputs image data in the first color space produced by the scanner with specific information, and wherein the controller further comprises a judging unit which judges that the received image data has the predetermined property when the received image data has the specific information.

10. The controller device of claim 9, wherein the specific information is machine information of the imaging device.

11. The controller device of claim 10, wherein the machine information includes at least one of a serial number of the imaging apparatus and a version number of a firmware installed into the imaging device.

12. The controller device of claim 9, wherein the specific information includes parameter information which is used for converting image data in the first color space into image data in the second color space in the imaging device.

13. The controller device of claim 8, wherein the first color space is RGB color space and the second color space is CMYK color space.

14. The image forming apparatus of claim 7, wherein the printer controller further includes the second color converter.

* * * * *